(12) United States Patent
Santi et al.

(10) Patent No.: US 8,333,409 B2
(45) Date of Patent: Dec. 18, 2012

(54) THREADED JOINT WITH PRESSURIZABLE SEAL

(75) Inventors: Nestor J. Santi, Buenos Aires (AR); Gastón Mazzaferro, Buenos Aires (AR); Alfredo Quiroga, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 313 days.

(21) Appl. No.: 12/665,902

(22) PCT Filed: Jun. 25, 2008

(86) PCT No.: PCT/EP2008/058073
§ 371 (c)(1),
(2), (4) Date: Dec. 21, 2009

(87) PCT Pub. No.: WO2009/000851
PCT Pub. Date: Dec. 31, 2008

(65) Prior Publication Data
US 2010/0187808 A1    Jul. 29, 2010

(30) Foreign Application Priority Data

Jun. 27, 2007 (EP) .................................... 07111204

(51) Int. Cl.
*F16L 17/00* (2006.01)
*F16L 25/00* (2006.01)
(52) U.S. Cl. ............ 285/96; 285/97; 285/333; 285/334; 277/626; 277/332
(58) Field of Classification Search .................. 285/96, 285/97, 333, 334; 277/625, 626, 322, 331, 277/332, 333, 334
See application file for complete search history.

(56) References Cited

U.S. PATENT DOCUMENTS

| | | | |
|---|---|---|---|
| 1,671,458 A | 5/1928 | Wilson |
| 1,999,706 A | 4/1935 | Spang |
| 2,075,427 A | 3/1937 | Church |
| 2,211,173 A | 8/1940 | Shaffer |

(Continued)

FOREIGN PATENT DOCUMENTS

AT    388791 B    8/1989

(Continued)

OTHER PUBLICATIONS

EPO Machine Translation of EP340385A2 Retrieved Dec. 31, 2011 From http://translationportal.epo.org/.*

(Continued)

*Primary Examiner* — James Hewitt
*Assistant Examiner* — Jay R Ripley
(74) *Attorney, Agent, or Firm* — Knobbe Martens Olson & Bear, LLP (57) ABSTRACT

A threaded joint comprises a pin coupled to a box with an annular groove, one or a pair of seal rings, and hydraulic actuating means to pressurize the seal ring or rings against the pin to provide sealability of the joint. The seal ring or rings comprise a frustoconical surface, an external surface, and an internal surface with one or more protruding annular ribs. In the unpressurized state, the seal ring or rings do not protrude from the groove. In the pressurized state, the frustoconical surface of the sealing ring is in sealing contact with an internal surface of the annular groove of the box, and the annular ribs of the sealing ring are in sealing contact with the external surface of the pin.

24 Claims, 5 Drawing Sheets

U.S. PATENT DOCUMENTS

| | | | |
|---|---|---|---|
| 2,487,241 A | 11/1949 | Hilton | |
| 2,631,871 A | 3/1953 | Stone | |
| 2,992,613 A | 7/1961 | Bodine | |
| 3,054,628 A | 9/1962 | Hardy et al. | |
| 3,307,860 A | 3/1967 | Blount et al. | |
| 3,489,437 A | 1/1970 | Duret | |
| 3,572,777 A | 3/1971 | Blose et al. | |
| 3,810,793 A | 5/1974 | Heller | |
| 3,889,989 A | 6/1975 | Legris et al. | |
| 4,299,412 A | 11/1981 | Parmann | |
| 4,373,750 A | 2/1983 | Mantelle et al. | |
| 4,384,737 A | 5/1983 | Reusser | |
| 4,406,561 A | 9/1983 | Ewing | |
| 4,475,839 A | 10/1984 | Strandberg | |
| 4,570,982 A | 2/1986 | Blose et al. | |
| 4,591,195 A | 5/1986 | Chelette et al. | |
| 4,602,807 A | 7/1986 | Bowers | |
| 4,623,173 A | 11/1986 | Handa et al. | |
| 4,662,659 A | 5/1987 | Blose et al. | |
| 4,688,832 A | 8/1987 | Ortloff et al. | |
| 4,706,997 A | 11/1987 | Carstensen | |
| 4,762,344 A | 8/1988 | Perkins et al. | |
| 4,844,517 A | 7/1989 | Beiley et al. | |
| 4,856,828 A | 8/1989 | Kessler et al. | |
| 4,955,645 A | 9/1990 | Weems | |
| 4,958,862 A | 9/1990 | Cappelli et al. | |
| 4,988,127 A | 1/1991 | Cartensen | |
| 5,007,665 A | 4/1991 | Bovisio et al. | |
| 5,067,874 A * | 11/1991 | Foote | 415/230 |
| 5,137,310 A | 8/1992 | Noel et al. | |
| 5,180,008 A * | 1/1993 | Aldridge et al. | 277/322 |
| 5,348,350 A | 9/1994 | Blose et al. | |
| 5,515,707 A | 5/1996 | Smith | |
| 5,712,706 A | 1/1998 | Castore et al. | |
| 5,794,985 A | 8/1998 | Mallis | |
| 5,810,401 A * | 9/1998 | Mosing et al. | 285/333 |
| 6,070,912 A | 6/2000 | Latham | |
| 6,173,968 B1 | 1/2001 | Nelson et al. | |
| 6,349,979 B1 | 2/2002 | Noel et al. | |
| 6,412,831 B1 | 7/2002 | Noel et al. | |
| 6,447,025 B1 | 9/2002 | Smith | |
| 6,481,760 B1 | 11/2002 | Noel et al. | |
| 6,494,499 B1 | 12/2002 | Galle, Sr. et al. | |
| 6,550,822 B2 | 4/2003 | Mannella et al. | |
| 6,557,906 B1 | 5/2003 | Carcagno | |
| 6,752,436 B1 | 6/2004 | Verdillon | |
| 6,755,447 B2 | 6/2004 | Galle, Jr. et al. | |
| 6,764,108 B2 | 7/2004 | Ernst et al. | |
| 6,851,727 B2 | 2/2005 | Carcagno et al. | |
| 6,857,668 B2 | 2/2005 | Otten et al. | |
| 6,905,150 B2 | 6/2005 | Carcagno et al. | |
| 6,921,110 B2 | 7/2005 | Morotti et al. | |
| 6,991,267 B2 | 1/2006 | Ernst et al. | |
| 7,014,223 B2 | 3/2006 | Della Pina et al. | |
| 7,066,499 B2 | 6/2006 | Della Pina et al. | |
| 7,108,063 B2 | 9/2006 | Carstensen | |
| 7,255,374 B2 | 8/2007 | Carcagno et al. | |
| 7,431,347 B2 | 10/2008 | Ernst et al. | |
| 7,464,449 B2 | 12/2008 | Santi et al. | |
| 7,475,476 B2 | 1/2009 | Roussie | |
| 7,506,900 B2 | 3/2009 | Carcagno et al. | |
| 7,621,034 B2 | 11/2009 | Roussie | |
| 7,735,879 B2 | 6/2010 | Toscano et al. | |
| 7,753,416 B2 | 7/2010 | Mazzaferro et al. | |
| 8,215,680 B2 | 7/2012 | Santi | |
| 2003/0168859 A1 | 9/2003 | Watts | |
| 2004/0118490 A1 | 6/2004 | Klueh et al. | |
| 2004/0118569 A1 | 6/2004 | Brill et al. | |
| 2005/0093250 A1 | 5/2005 | Santi et al. | |
| 2005/0166986 A1 | 8/2005 | Dell'erba et al. | |
| 2006/0006600 A1 | 1/2006 | Roussie | |
| 2006/0273586 A1 | 12/2006 | Reynolds, Jr. et al. | |
| 2007/0039149 A1 | 2/2007 | Roussie | |
| 2008/0303274 A1 | 12/2008 | Mazzaferro et al. | |
| 2010/0181727 A1 | 7/2010 | Santi et al. | |
| 2010/0181761 A1 | 7/2010 | Santi et al. | |
| 2010/0187808 A1 | 7/2010 | Santi et al. | |
| 2011/0008101 A1 | 1/2011 | Santi et al. | |
| 2011/0041581 A1 | 2/2011 | Santi | |
| 2011/0042946 A1 | 2/2011 | Santi | |
| 2011/0133449 A1 | 6/2011 | Mazzaferro | |
| 2011/0233925 A1 | 9/2011 | Pina et al. | |
| 2011/0233926 A1 | 9/2011 | Carcagno et al. | |
| 2012/0032435 A1 | 2/2012 | Carcagno et al. | |

FOREIGN PATENT DOCUMENTS

| | | |
|---|---|---|
| CA | 2319926 | 7/2008 |
| DE | 3310226 A1 | 10/1984 |
| EP | 0 032 265 | 7/1981 |
| EP | 0 104 720 | 4/1984 |
| EP | 0 159 385 | 10/1985 |
| EP | 0 309 179 | 3/1989 |
| EP | 0340385 A | 11/1989 |
| EP | 340385 A2 * | 11/1989 |
| EP | 0 989 196 | 3/2000 |
| EP | 1 065 423 | 1/2001 |
| EP | 1 277 848 | 1/2003 |
| EP | 1 296 088 | 3/2003 |
| EP | 1 362977 | 11/2003 |
| EP | 1 705 415 | 9/2006 |
| EP | 1 726 861 | 11/2006 |
| EP | 1554518 B1 | 1/2009 |
| FR | 1 149 513 A | 12/1957 |
| FR | 2 704 042 A | 10/1994 |
| FR | 2 848 282 A1 | 6/2004 |
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 A | 10/2002 |
| WO | WO 02/093045 | 11/2002 |
| WO | WO 03/087646 A | 10/2003 |
| WO | WO 2004/033951 | 4/2004 |
| WO | WO 2004/053376 | 6/2004 |
| WO | WO 2006/087361 | 8/2006 |
| WO | WO 2007/002576 | 1/2007 |
| WO | WO 2007/017161 | 2/2007 |
| WO | WO 2007/063079 | 6/2007 |
| WO | WO 2008/090411 | 7/2008 |
| WO | WO 2009/000766 | 12/2008 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

International Search Report as mailed on Aug. 25, 2008 in PCT Application No. PCT/EP2008/058073.

American Petroleum Institute, Specification 5B, Apr. 2008, 15th Edition (Excerpts Only).

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

International Preliminary Report on Patentability dated Jan. 5, 2010 from PCT Application No. PCT/EP2008/058073.

International Written Opinion dated Aug. 25, 2008 from PCT Application No. PCT/EP2008/058073.

* cited by examiner

THREADED JOINT WITH PRESSURIZABLE SEAL

CROSS-REFERENCE TO RELATED APPLICATIONS

This application is a U.S. National Phase of the PCT International Application No. PCT/EP2008/058073, filed Jun. 25, 2008 and published as WO 2009/000851 on Dec. 31, 2008, which claims priority to European Application No. 07111204.9, filed Jun. 27, 2007. The disclosure of both prior applications is incorporated by reference in their entirety and should be considered a part of this specification.

FIELD OF THE INVENTION

The present invention relates to threaded joints, in particular for connecting tubes to create strings used in the hydrocarbon industry especially for use in the field of OCTG (Oil Country Tubular Goods) and pipelines in offshore applications.

BACKGROUND OF THE INVENTION

Searching for oil or, more generally, hydrocarbons has become more demanding in terms of hardware and devices in recent years because oil and gas fields or reservoirs are located deeper or in places difficult to reach and below the sea. Prospecting for and exploitation of hydrocarbon fields demands hardware which is more resistant to environmental challenges such as higher loads and corrosion, which were less important previously.

In some applications threaded joints can be subject to deformation of the joint seals.

Modern joints are generally designed with metal to metal seals made by the contact between two surfaces, usually at one end or at both ends of the threaded portion of the joint, interfering in the elastic range of the modulus of elasticity for an appropriate stress magnitude. However there are situations where resilient seals are needed instead of or in combination with metal seals, to prevent penetration of external fluids into the interstices of the threads.

It is therefore a design requirement that the joint seals resist penetration of external or internal fluids, or at least do not allow continuous exchange of fluids that have already penetrated the joint with surrounding fluids, in order to reduce the corrosion rate.

Currently a widespread technical solution to the problem of externally sealing a threaded connection is to use O-rings or resilient seal rings of various cross-sections, made of elastomeric or composite materials.

Complex resilient seal rings and simple O-rings perform their sealing function based on the diametrical geometric interference between pin and box, which is predefined with respect to at least one of the joint members. Said geometric interference appears after make up of the connection, to elastically deform the seal ring and thus induce contact pressures between the seal and each of the pin and box, defining a mechanical barrier which seals the joint. An additional energization of the seal ring is provided by the external fluid pressure which increases deformation and adherence to the seat where the seal ring is housed.

An example of an O-ring is disclosed in U.S. Pat. No. 6,173,968 for sealing a joint between a pin and box. An O-ring abuts an annular backup ring of substantially the same diameter. The annular backup ring is split to permit radial expansion and has a greater thickness on its outer periphery than on its inner periphery. When the joint being sealed is under high pressure, the seal ring urges the backup ring to expand radially to cover any gap between the members being sealed, maintaining sealing capacity, even under high temperature conditions, and preventing the sealing ring from extruding into the gap. The pressure varies with sea depth and seal efficiency is reduced when lower pressures act on the O-ring.

In this document the external pressure on the joint determines also the pressure acting on the O-ring. When higher contact pressures are needed for the O-ring, then higher geometric interference is required between the O-ring and joint members. This might cause seal breakage.

Another way to improve efficiency of the sealing capacity of the O-ring is by increasing geometric interference, which is achieved in most cases by making the seal ring radially bigger than its housing. However, the bigger the seal ring, the more exposed is it to damage during make up, especially when it is pre-mounted in the box member and it is forced to overcome the entire pin threaded area.

In this case other drawbacks may arise. Several geometric connection variables that originate during the manufacturing process, such as ovality, eccentricity, and rugosity, introduce uneven interference over the whole circumference of the sealing surfaces, thus producing uneven contact pressures and reducing the sealing capacity.

In practice, sealing capacity due to geometric interference is limited by the geometry, mainly radial sizes and length, of resilient elements in relation to their ability to be dragged during make up across the threads and any other interfering surface without being damaged.

SUMMARY OF THE INVENTION

It is therefore an object of the present invention to provide a threaded joint which overcomes the aforementioned drawbacks.

The principal object of the present invention is to provide a joint having an innovative seal ring ensuring both simple and reliable initial make-up and a high sealing efficiency during operation.

The above mentioned objects are achieved in accordance with the present invention by means of a threaded tube joint defining an axis comprising a male threaded tube, defined as a pin, and a female threaded tube, defined as a box, the pin being adapted to be made up in the box. A seal ring has an external cylindrical surface, an internal surface comprising one or more annular ribs protruding from the internal surface, a first base with at least a portion of a frustoconical shape, a second base with at least a portion of a frustoconical shape axially opposite to the first base. The first and second bases are slanted towards the axis whereby the external surface is wider than the internal surface. The seal ring is interposed between the pin and the box in tight sealing contact with an internal surface of an annular groove of the box by the external cylindrical surface and in tight sealing contact with an external surface of the pin by the annular ribs. Hydraulic actuating means can pressurize the seal ring against said pin to provide improved scalability of the joint.

In the threaded joint of the invention the seal ring is housed within the box member, and is actuated and energized by means of the pressurization of an external injected fluid, injection and pressurization of this fluid being effected via a non-return valve, fixed to the box member.

The housing for the seal ring is an annular groove formed in the box member of the threaded joint. It houses and protects the seal ring against shocks before it is activated by the pressurizing fluid. This housing is configured to provide a fluid tight cavity embracing the seal ring and allowing its energization.

The box of the threaded joint incorporating this seal is made in such a way that the seal ring actuates on a cylindrical surface, advantageously that of the tube body, and thus the pin does not need to be modified. In this manner the joint's performance under tension loads remains intact.

Both the annular groove, non-return valve and seal ring are completely contained within the box wall thickness, this having the advantage of preserving coupling design and performance as well as protecting the sealing system. Full design via FEA and full scale testing yielded optimized interaction of the seal ring with the annular groove, and the threaded joint of the invention can withstand high axial loads.

BRIEF DESCRIPTION OF THE DRAWINGS

The foregoing and other objects will become more readily apparent by referring to the following detailed description and the appended drawings in which.

DETAILED DESCRIPTION

With particular reference to the figures, there is shown a threaded joint indicated overall by reference numeral 1, connecting two tubes, a male tube 3, also called a pin, with a nominal external diameter D, and a female pipe 2, also called a box, of external diameter D1.

The pin 3 has a threaded portion 5, with male threads of appropriate profile, e.g. trapezoidal, and the box 2 has an internal threaded portion 4 with female threads. The common axis of the pipe and the pin and box is indicated by A.

The box 2 ends with a nose 6. The portion of the box 2 close to the nose 6 comprises a non-threaded surface 7.

Preferably, but not necessarily, the joint 1 has an internal metal-to-metal seal between the pin nose 6' of the pin 3 and box shoulder 8.

Figure 1:
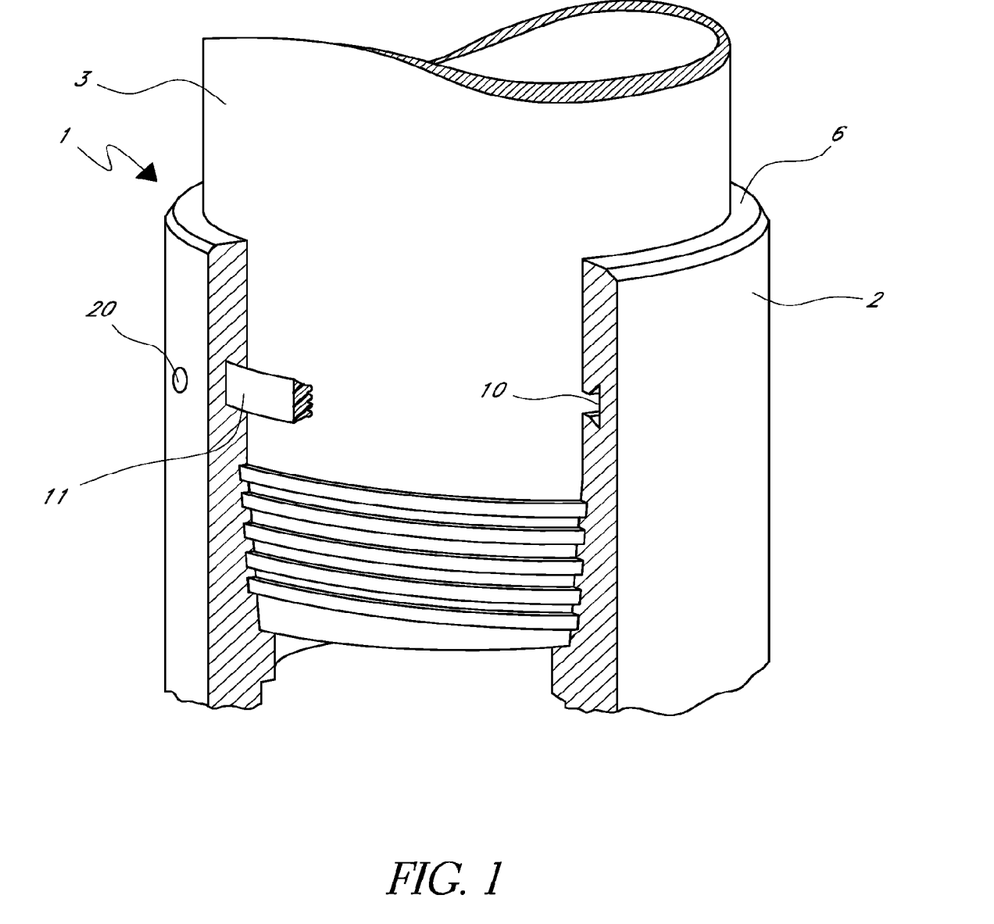
FIG. 1 shows a perspective view of a partial section of the joint in accordance with the present invention.

With particular reference to the embodiment of FIG. 1, there is provided a housing configured as an annular groove 10 in the box 2 between the end of the thread 4 and the nose 6. The groove 10 houses a ring 11 forming an external seal when the joint 1 is made up.

In some embodiments, the seal ring 11 performs the function of an external seal placed between the box 2 and the pin 3 or the tube body, such that it prevents leakage of external fluids into the threaded zone of the joint 1. However, the seal ring 11 could be used in other parts of a threaded joint.

The seal ring 11 is actuated when an external fluid is injected and pressurized through a valve 20 into the housing 10. This pressure is generated in a chamber 13 and acts onto a surface 25 of the ring, thus deforming and forcing the seal ring 11 both against the sides 14, 15, 16, 17 of the housing 10 and against the pin 3, to produce a mechanical barrier which seals the joint 1.

Figure 6:
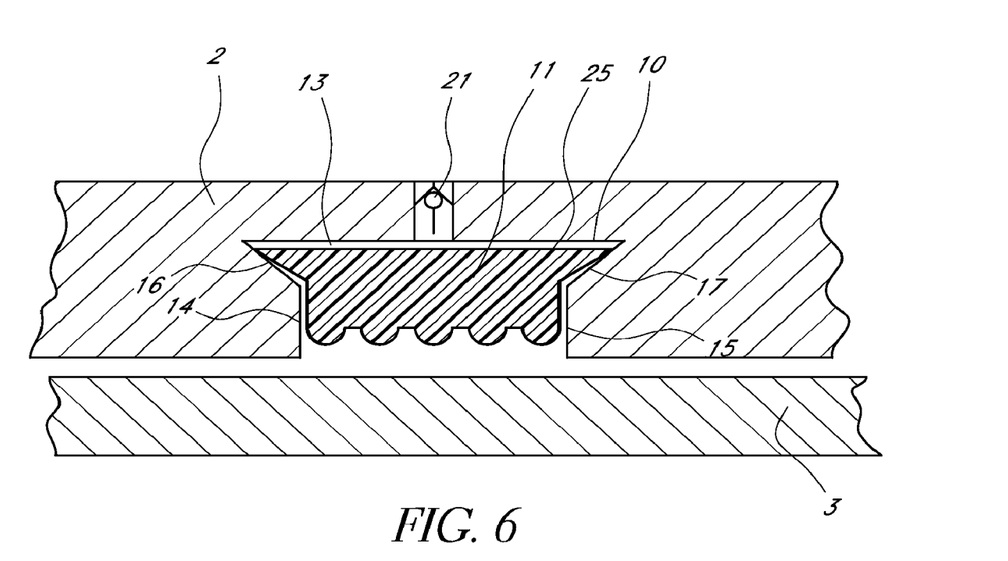
FIG. 6 shows a section view of an enlarged particular of the joint according to the invention in a first working stage.
Figure 7:
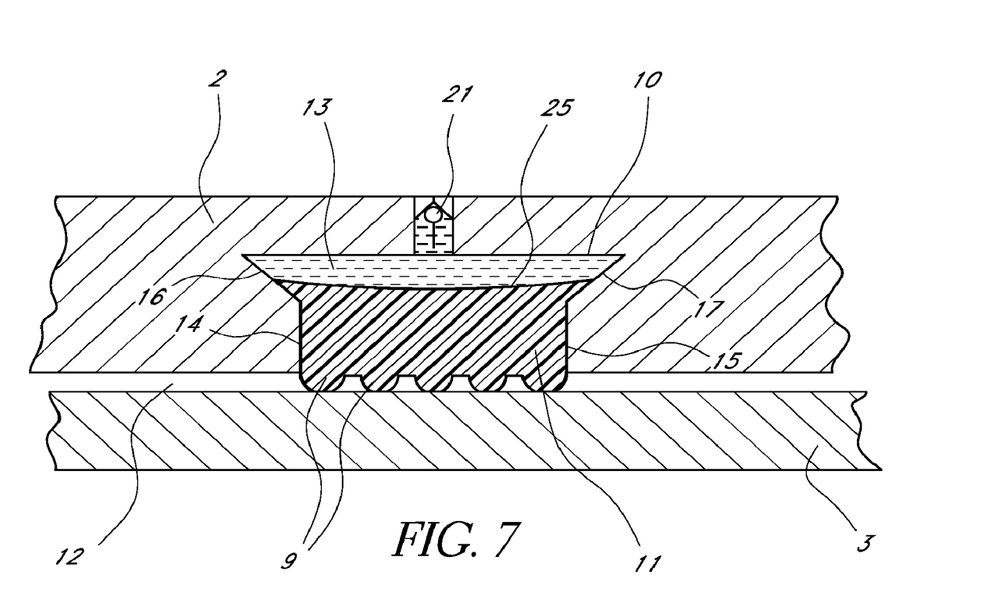
FIG. 7 shows a section view of an enlarged particular of the joint according to the invention in a second working stage.

The groove or housing 10 holds, hides and protects the seal ring 11 before injection of the actuation fluid, corresponding to the position as shown in FIG. 6. Together with the seal ring 11 it constitutes a fluid tight annular pressure chamber when actuation fluid is injected and pressurized through the valve 20. The valve 20 is a non-return valve and is fixed to the box 2, the valve tip being advantageously flush with the box surface, to avoid damage to the valve or danger to operators. Injection of the actuation fluid and subsequent energization and activation of the sealing system is performed after the joint 1 is in its final made up position.

The seal ring 11 actuates against a cylindrical surface of the pin member 3 or on the tube body, depending on the position of the housing along the box 2. This surface where the seal ring 11 contacts the pin 3 is either rolled or machined, and corresponds advantageously, but not exclusively, to the zone comprising the thread run out part. In this manner the pin 3 geometry is not modified, thus the tensional efficiency of the joint remains unaffected.

The actuating fluid may be either a high or low viscosity fluid, such as oil, grease, dope, gel, etc, or a polymer which solidifies after injection, or indeed the fluid present outside the connection, i.e. the same fluid the seal intends to prevent from leaking into the joint.

An advantage of the invention is that the seal ring 11 is protected, since it remains hidden during make up, and is prevented from undergoing any kind of damage, this objective being accomplished without affecting the joint performance.

Another advantage of the invention is the fact that contact pressures deployed by the sealing system are proportional to the pressure of the actuating fluid, these being well known and defined at the moment of injecting and pressurizing the actuating fluid. On the other hand, the magnitude of this actuation pressure is completely independent of the pressure generated by the fluid external to the joint. Furthermore, contact pressures produced by the seal ring 11 are also independent of geometrical parameters of the joint itself, such as ovality, eccentricity, rugosity, and type of connection, and are uniform over the whole circumference of the joint 1, as geometry, shape, length of both seal and contact areas are variables independent of the joint type.

The internal surface of the seal ring 11 is configured with a plurality of protruding ribs 9, thus adding sealability, as the adjacent ribs 9 offer multiple subsequent barriers against external fluid when the seal ring 11 is loaded. If one or more barriers leak, subsequent barriers can still withstand the external pressure and ensure sufficient sealing capability.

Figure 2:
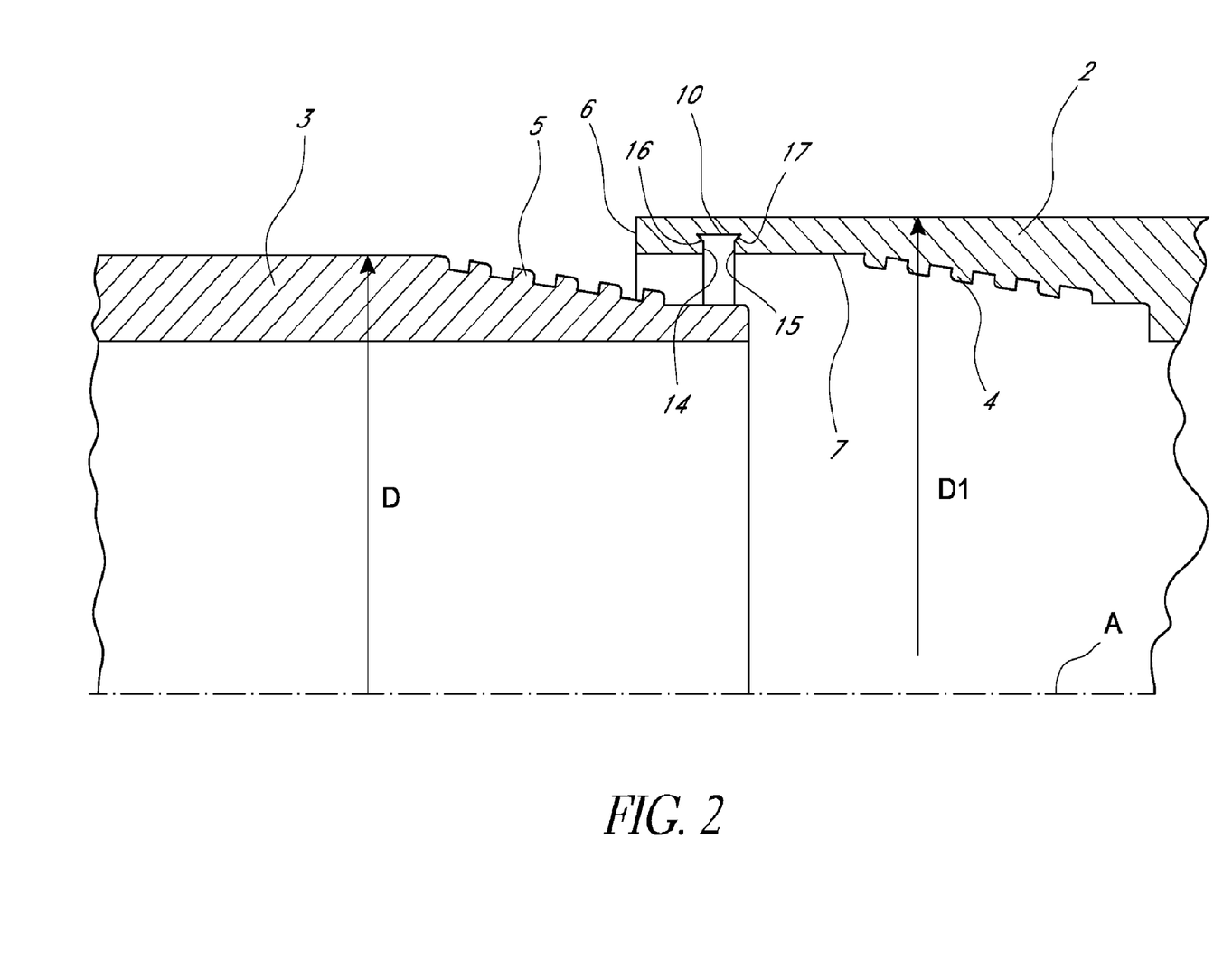
FIG. 2 shows a section view along an axial plane of an embodiment of the joint in accordance with the invention.

In a first embodiment of the threaded joint 1, shown in FIG. 2, the annular groove geometry has a dovetail or wedge shape in axial section, i.e. its shape is such that the section width increases as the radial distance from the axis A increases, with two lateral surfaces 16, 17 inclined towards each other.

In this embodiment the groove also has advantageously two annular plane surfaces 14, 15 opposite and parallel to each other. This particular shape of the groove 10, when the joint 1 is made up, forces the seal ring 11 to shrink and be energized when pressed by the actuating fluid in the annular chamber 13.

Figure 5:
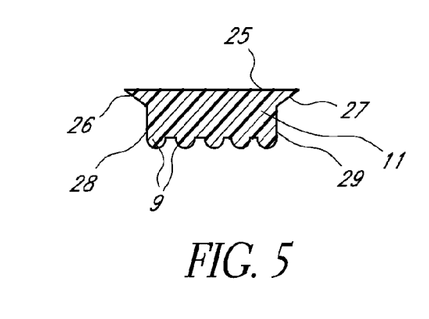
FIG. 5 shows a section view along an axial plane of another embodiment of an element of the joint in accordance with the invention.

The section of the seal ring 11 on an axial plane is configured to be housed in the groove 10 and has various alternative shapes, one of which is shown in FIG. 5 complementary to that of the groove 10. It has a first base 26 with a portion of a frustoconical shape, a second base 27 with a portion of a frustoconical shape axially opposite to the first base, first 26 and second 27 bases being slanted towards the axis A so that its external surface 25 is wider than the internal surface of the seal ring with the ribs 9.

Figure 2A:
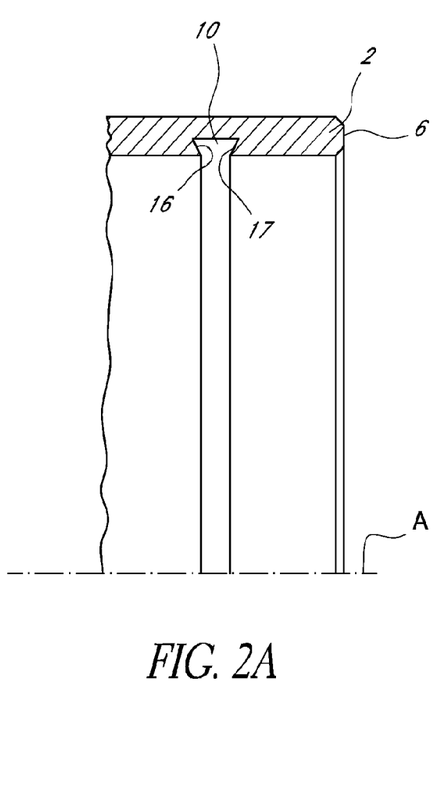
FIG. 2a shows a section view along an axial plane of a detail of the box of the joint in accordance with the invention.
Figure 3:
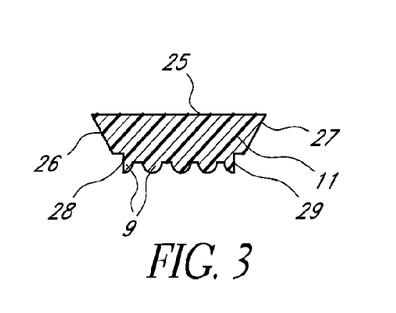
FIG. 3 shows a section view along an axial plane of an embodiment of an element of the joint in accordance with the invention.
Figure 4:
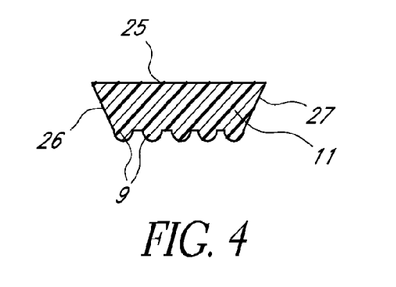
FIG. 4 shows a section view along an axial plane of another embodiment of an element of the joint in accordance with the invention.

In an alternative embodiment of the groove 10, shown in FIG. 2a, the groove 10 has a simple dovetail section and the associated seal ring 11 has preferably a shape like the ones shown in FIGS. 3 and 4.

In the embodiments of FIGS. 3 and 5, the seal ring 11 has also a portion 28, 29 of each first and second base which has the shape of an annulus.

These shapes of the seal ring 11 yield optimized contact surfaces and optimized seal ring deformation.

The groove 10 radial depth and the seal ring 11 thickness are defined in accordance with the box 2 wall thickness and taking into account the requirement of completely hiding the seal in the groove 10 when the chamber 13 is not pressurized.

The groove 10 has a width of about 15 mm and the seal ring 11 has a similar width, smaller, greater or equal to the groove's width, depending on the geometry of the groove, the shape and material of the seal ring 11, the type and pressure of the actuating fluid.

The pressure in the chamber 13 can be set to a value between about 100 psi (6.89 bar) and 5000 psi (344.73 bar). This range gives a good seal ring deformation pattern, suitable for the expected range of operation conditions, both in the transient and in the steady state and optimal deformation/stress ratio at concentrating points, necessary to assess seal integrity. Another advantage of a pressure of such magnitude is a good contact pattern between seal and groove, necessary to assess fluid-tight cavity, and a good magnitude and contact pattern between seal and pin, necessary to assess joint sealing capacity.

Actuating fluids for pressurizing seal ring 11 may have either a high or low viscosity fluid, such as oil, grease, dope, gel, etc, or a polymer which solidifies after injection, or indeed the fluid present outside the connection, i.e. the same fluid the seal prevents from leaking into the joint.

An additional advantage of the threaded joint 1 is that its tensional efficiency can be improved by means of this sealing ring 11. The threaded joint 1 allows, if required for structural reasons, the lengthening of the threaded zone or use of truncated or vanishing threads to be avoided, because the seal ring is mounted and protected in the groove 10 of the box 2 which hides and protects the seal ring 11 within the box 2. The threaded joint 1 renders superfluous the making of a thread run-out zone (i.e. threads with truncated crests) at the extremities of the thread, when this is made to prevent damage of a seal ring during pre-mounting onto the pin, because the seal ring has to be dragged over the threads. One disadvantage of a thread run-out zone is that the worst stress condition is produced on the seal ring 11 in the last thread of the zone, which has a larger diameter than the nose of the pin 3 and is a reason why threads are truncated. Therefore, in such case valuable thread height is lost for protecting the seal ring 11.

Figure 8:
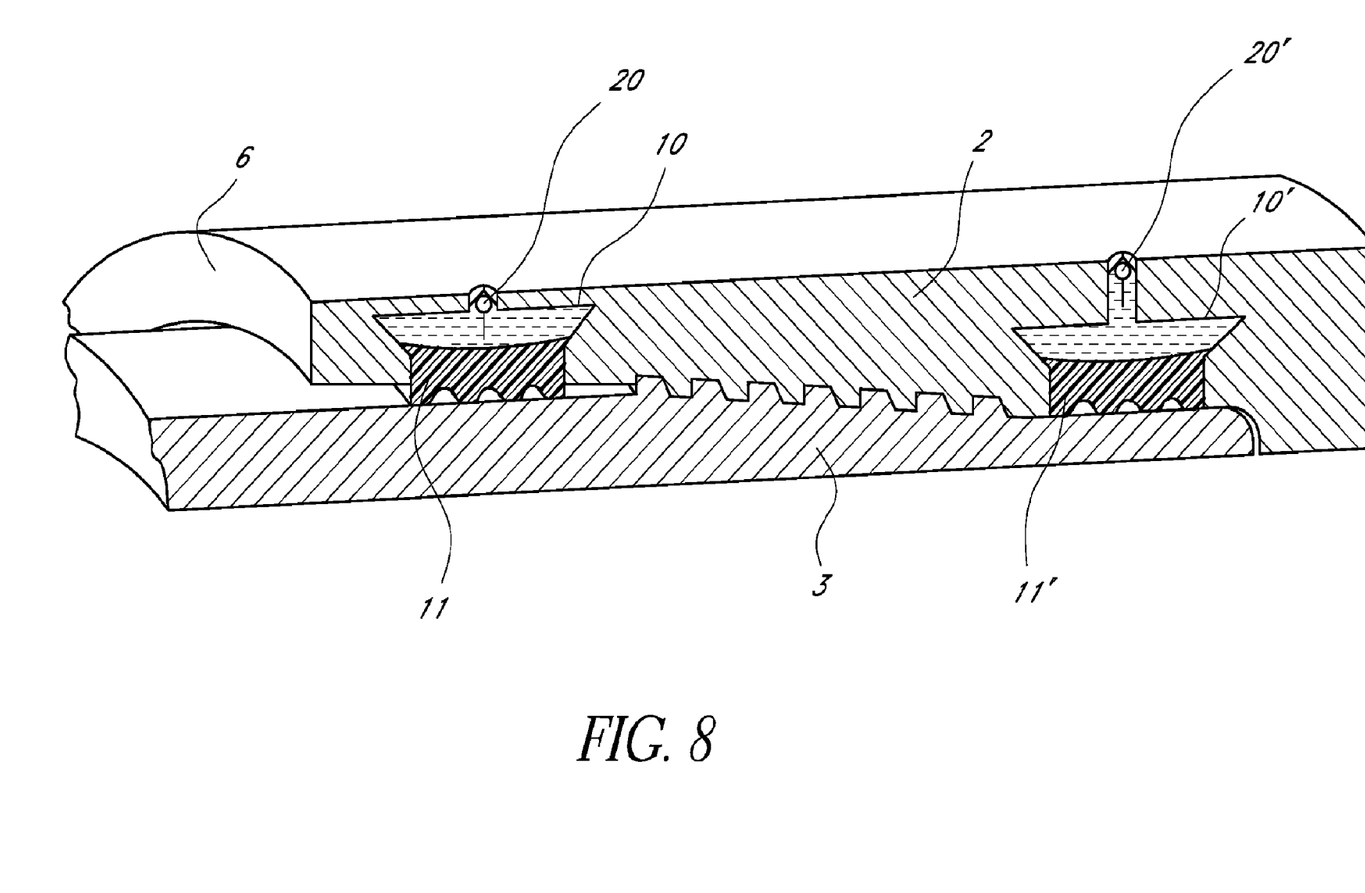
FIG. 8 shows a section view along an axial plane of another embodiment of the box of the joint in accordance with the invention.

With particular reference to FIG. 8, there is shown another embodiment of a joint according to the invention having two seal rings 11, 11' inserted in two annular grooves 10, 10' formed in the box 2. In this embodiment one seal ring 11 is positioned in the portion of the box 2 near its nose 6 which, after make up, faces the portion of the pin 3 after the threaded portion 5. The second seal ring 11' is positioned in the threadless portion of the box 2 which, after make up, faces the foremost portion of the pin 3 near its nose.

In this embodiment the seal ring 11', like the seal ring 11, can be formed according to one of the variants as described above. Alternatively, if appropriate for obtaining the best sealing results, the seal ring 11 and 11' can be formed differently from each other: the first seal ring according to one variant among those described above and the second seal ring according to a different variant.

In some specific embodiments of the joint the two rings can be actuated with different pressures of the actuating fluid so that the pressure exerted by one seal ring is either greater or lower than the other.

Alternatively in another embodiment not shown in the figures the joint 1 can be used with the seal ring 11 alone in the position shown in FIG. 8, but without the seal ring 11'. This embodiment can be used for example, but not necessarily, in combination with a metal to metal seal located in the vicinity of the pin 3 nose. The joint of the invention in its various embodiments can almost completely prevent leaking, providing full tightness.

The invention is to be used preferably in the field of OCTG and line pipe connections for the oil & gas industry, especially in offshore applications.

What is claimed is:

1. A threaded joint having a longitudinal axis, the joint comprising:
   a threaded pin and a threaded box, the pin being adapted to be made up in the box, the box including an annular groove comprising a groove bottom and first and second sidewalls, the first sidewall longitudinally spaced apart from the second sidewall; and
   a seal ring having:
      a generally right circular cylindrical external surface of generally uniform diameter extending between a first base and a second base;
      an internal surface radially opposite from the external surface, the internal surface comprising a plurality of protruding annular ribs;
      the first base having at least a portion with a frustoconical shape; and
      the second base having at least a portion with a frustoconical shape axially opposite to the first base;
   the first and second bases being slanted such that the external surface is wider than the internal surface;
   the seal ring being interposed between the pin and the box;
   wherein the seal ring is uniformly solid from the external surface to the inner surface and wherein the seal ring is uniformly solid from the first base to the second base;
   the first and second bases of the seal ring being in sealing contact with respective surfaces of the first and second sidewalls of the annular groove in the box;
   the internal surface of the seal ring configured to sealingly contact an exterior surface of the pin, wherein each and every one of the ribs is configured to sealingly contact the exterior surface of the pin when the seal ring is pressurized against the pin;
   the external surface of the seal ring extending from the first sidewall to the second sidewall;
   the first end of the external surface being longitudinally spaced-apart from the second end by a first longitudinal distance when about the same amount of pressure is acting on the external surface and the internal surface, the first end being longitudinally spaced-apart from the second end by a second longitudinal distance when a greater amount of pressure is acting on the external surface than on the internal surface, the first longitudinal distance being greater than the second longitudinal distance;

wherein a radial depth of the groove is greater than a radial thickness of the seal ring;

the seal ring is pressurized against said pin by a fluid acting solely on said external surface to sealingly contact said exterior surface of the pin; and wherein the entire external surface of the seal ring is radially spaced apart from the groove bottom when the seal ring is not pressurized against the pin.

2. A threaded joint according to claim 1, wherein the seal ring comprises a polymeric material.

3. A threaded joint according to claim 1, wherein the groove has a dovetail cross-sectional shape along an axial plane of the box.

4. A threaded joint as in claim 1, wherein the seal ring is disposed beyond a distal end of the threads of the box.

5. The threaded joint of claim 1, wherein the joint is configured to be disposed in a fluid, and wherein the joint is configured to hydraulically pressurize the seal ring against the pin via the fluid.

6. The threaded joint of claim 1, wherein the seal ring is radially pressurized to about 100 to 5,000 psi.

7. The threaded joint of claim 1, wherein the threads of the pin and the box are substantially uniform in height relative to a corresponding base surface of the pin and the box.

8. The threaded joint according to claim 1, wherein the frustoconical shape of the first base and the second base extends to the external surface thereby forming a flanged portion of the seal ring.

9. The threaded joint according to claim 1, wherein:
the first sidewall comprises a first angled portion and the second sidewall comprises a second angled portion, the first and second angled portions being angled toward each other; and
when a greater amount of pressure is acting on the external surface than on the internal surface, the first base is configured to engage the first angled portion and the second base is configured to engage the second angled portion.

10. A threaded joint according to claim 1, wherein the box further comprises a valve.

11. A threaded joint according to claim 10, wherein the valve is flush with the box.

12. A threaded joint as in claim 1, wherein the box further comprises a nose spaced a distance from a proximal end of the threads, the seal ring being disposed between the nose and the proximal end of the threads.

13. A threaded joint as in claim 12, further comprising a second seal ring disposed beyond a distal end of the threads.

14. A threaded joint as in claim 13, wherein the seal ring and second seal ring are disposed in a non-threaded portion of the box and contact a non-threaded portion of the pin.

15. A joint having a longitudinal axis, the joint comprising:
a threaded box comprising one or more circumferential grooves about the axis of the box and one or more valves in communication with the one or more grooves, the threaded box configured to couple to a threaded pin;
one or more sealing rings each disposed in a corresponding one of said circumferential grooves, the sealing rings each having an intermediate portion joining an external surface and an internal surface, the external surface configured to face the box and the internal surface configured to face the pin when the pin and box are coupled, the external surface being a generally right circular cylinder in shape when about the same amount of pressure is acting on the internal and external surfaces, the intermediate portion comprising frustoconical surfaces that extend from the external surface toward the internal surface thereby forming a flanged portion of the sealing ring;

the one or more sealing rings being configured to contact the pin when the sealing rings are pressurized such that a greater amount of pressure is acting on the respective external surfaces of the sealing rings than on the respective internal surfaces of the sealing rings;

wherein the one or more grooves define a depth greater than a radial width of the corresponding sealing ring disposed in the groove, such that the sealing ring does not protrude from the groove until the sealing ring is pressurized radially inward;

wherein each of the grooves includes a groove bottom and wherein the entire external surface of each of the sealing rings disposed in the corresponding groove is radially spaced apart from the corresponding groove bottom when the sealing ring is not pressurized against the pin;

wherein the external surface of each of the sealing rings comprises a first end and a second end, the first end being longitudinally spaced-apart from the second end by a first longitudinal distance when about the same amount of pressure is acting on the external surface and the internal surface, the first end being longitudinally spaced-apart from the second end by a second longitudinal distance when a greater amount of pressure is acting on the external surface than on the internal surface, the first longitudinal distance being greater than the second longitudinal distance;

wherein each of the grooves comprises first and second sidewalls, each sidewall comprising a groove frustoconical surface, the frustoconical surface of each of the sealing rings engaging corresponding groove frustoconical surfaces thereby facilitating the change from the first longitudinal distance to the second longitudinal distance between the first and second ends;

wherein the external surface of each of the sealing rings disposed in the corresponding groove extends from the respective first sidewall to the respective second sidewall;

wherein the internal surface of each of the sealing rings comprises a plurality of protruding annular ribs, wherein each and every one of the ribs is configured to sealingly contact the pin when the sealing ring is pressurized against the pin;

wherein each of the sealing rings is pressurized against said pin by a fluid acting solely on the respective external surface of each sealing ring to sealingly contact said pin; and wherein each of the sealing rings is uniformly solid from the external surface to the internal surface and wherein the sealing ring is uniformly solid longitudinally therethrough.

16. The joint according to claim 15, wherein the pin defines a portion of a male threaded tube, and box defines a portion of a female threaded tube.

17. The joint according to claim 15, wherein one of the one or more grooves is positioned between the proximal end of the box and the threads of the box.

18. The joint according to claim 15, wherein one of the one or more grooves is positioned between the distal end of the box and the threads of the box.

19. The joint according to claim 15, wherein the intermediate portion of each of the sealing rings further comprises annular surfaces that join respective said frustoconical surfaces to the respective internal surface, the annular surfaces being generally perpendicular to the longitudinal axis of the joint.

20. The joint according to claim 19, wherein each of the groove sidewalls comprise generally perpendicular to the longitudinal axis portions, the respective annular surfaces being longitudinally spaced-apart from the respective first and second sidewalls when about the same amount of pressure is acting on the respective external surfaces of the sealing rings than on the respective internal surfaces of the sealing rings.

21. A method of sealing a threaded joint having a longitudinal axis, the method comprising:
providing the joint of claim 1;
positioning the seal ring in the groove such that the seal ring does not protrude from the groove when the pin is inserted into the box;
inserting the threaded pin into the threaded box;
pressurizing the external surface of the seal ring such that the seal ring is pressed against the sidewalls thereby effecting the decrease in the longitudinal distance between the first and second ends of the external surface; and
contacting the pin with the internal surface of the seal ring to inhibit leakage of a fluid into the joint.

22. The method of claim 21, wherein pressurizing comprises hydraulically pressurizing an external surface of the seal ring with a fluid.

23. The method of claim 21, wherein the external surface is pressurized to about 100 psi to 5,000 psi.

24. The method of claim 21, wherein inserting the pin into the box comprises threadably coupling the pin to the box.

* * * * *

UNITED STATES PATENT AND TRADEMARK OFFICE
CERTIFICATE OF CORRECTION

PATENT NO. : 8,333,409 B2  
APPLICATION NO. : 12/665902  
DATED : December 18, 2012  
INVENTOR(S) : Santi et al.

Page 1 of 1

It is certified that error appears in the above-identified patent and that said Letters Patent is hereby corrected as shown below:

In the Specification

At Column 2, at line 59, change "scalability" to --sealability--.

Signed and Sealed this  
Twenty-ninth Day of October, 2013

Teresa Stanek Rea  
*Deputy Director of the United States Patent and Trademark Office*